(12) United States Patent
Kanno

(10) Patent No.: US 7,742,199 B2
(45) Date of Patent: Jun. 22, 2010

(54) SYSTEM AND METHOD FOR COMPRESSING AND ROTATING IMAGE DATA

(75) Inventor: Hiroki Kanno, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1659 days.

(21) Appl. No.: 10/958,467

(22) Filed: Oct. 6, 2004

(65) Prior Publication Data

US 2006/0072147 A1    Apr. 6, 2006

(51) Int. Cl.
*H04N 1/04* (2006.01)
(52) U.S. Cl. .................. 358/474; 358/1.15; 358/1.2; 358/539; 358/426.05; 382/166; 382/232; 382/233; 375/E7.094
(58) Field of Classification Search .............. 358/1.15, 358/474, 1.2, 1.17, 1.16, 523, 539, 448, 1.9, 358/426.05, 426.14; 382/166, 232, 233, 382/524, 296, 297; 375/E7.094
See application file for complete search history.

(56) References Cited

U.S. PATENT DOCUMENTS

| | | | |
|---|---|---|---|
| 6,223,181 B1 * | 4/2001 | Goldberg et al. ............ 707/101 |
| 6,330,282 B1 * | 12/2001 | Miyazaki ................ 375/240.16 |
| 6,717,690 B1 * | 4/2004 | Salgado et al. ............. 358/1.15 |
| 6,982,811 B2 * | 1/2006 | Sato ........................... 358/1.4 |
| 7,242,811 B2 * | 7/2007 | Fenney ........................ 382/240 |
| 7,321,445 B2 * | 1/2008 | Sato ........................... 358/1.4 |
| 7,321,455 B2 * | 1/2008 | Kinsman .................... 359/245 |
| 2005/0058353 A1 * | 3/2005 | Matsubara .................. 382/233 |
| 2006/0044576 A1 * | 3/2006 | Tabata et al. ................ 358/1.9 |
| 2006/0170708 A1 * | 8/2006 | Kyoung ...................... 345/648 |
| 2006/0215200 A1 * | 9/2006 | Mutsuro et al. ............ 358/1.13 |
| 2007/0103722 A1 * | 5/2007 | Sato .......................... 358/1.15 |

FOREIGN PATENT DOCUMENTS

JP    8-317225 A    11/1996
JP    10-93805 A    4/1998

* cited by examiner

*Primary Examiner*—Negussie Worku
(74) *Attorney, Agent, or Firm*—Foley & Lardner LLP

(57) ABSTRACT

A system and method for reproducing original documents includes scanning an original document to generate image data corresponding to the scanned original document, dividing the image data into a plurality of image data blocks, and compressing the plurality of image data blocks into respective compressed image data blocks, such that data of each compressed image data block is independent of data of each other compressed image data block. Each compressed image data block is stored in a first memory with a respective predetermined beginning address. The first compressed image data block, having a first predetermined beginning address, is accessed from the first memory and decompressed into a first decompressed image data block. At least one image processing function is performed on the decompressed first image data block.

32 Claims, 4 Drawing Sheets

SYSTEM AND METHOD FOR COMPRESSING AND ROTATING IMAGE DATA

FIELD OF THE INVENTION

The present invention relates generally to image processing and, more particularly, to a system and method for compressing and rotating image data.

BACKGROUND OF THE INVENTION

After scanning a document, a scanning device or other device having scanning capability, such as a photocopier, generates image data. To reduce the amount of space required to store the image data, these devices may use a compression algorithm, which reduces the amount of data needed to represent the original image data. Typical compression algorithms include the JPEG format and the MMR format. These compression algorithms are variable codeword length coding algorithms. As a result, when compressing the original image data, the size of the compressed image data varies at every position within the original image. More specifically, more complex regions having significant changes cannot be compressed as much as simpler regions with few or smaller changes.

Due to having different sizes of compressed image data in different regions, it is difficult to calculate an address of a particular pixel in the compressed image data. As a result, it is difficult to perform certain image processing algorithms, such as rotation. To overcome this difficulty, it is necessary to have a memory with a size sufficient to hold the entire uncompressed image data when performing the image data rotation. While performing the rotation without the larger memory for storing the entire uncompressed image data is possible, the resulting rotated image is typically degraded.

Accordingly, it would be desirable to have the ability to rotate the image data without the need for a large memory and without degrading the resulting image.

SUMMARY OF THE INVENTION

Briefly, in one aspect of the invention, a system and method for reproducing original documents includes scanning an original document to generate image data corresponding to the scanned original document, dividing the image data into a plurality of image data blocks, and compressing the plurality of image data blocks into respective compressed image data blocks, such that data of each compressed image data block is independent of data of each other compressed image data block. Each compressed image data block is stored in a first memory with a respective predetermined beginning address. The first compressed image data block, having a first predetermined beginning address, is accessed from the first memory and decompressed into a first decompressed image data block. At least one image processing function is performed on the decompressed first image data block.

Further features, aspects and advantages of the present invention will become apparent from the detailed description of preferred embodiments that follows, when considered together with the accompanying figures of drawing.

DETAILED DESCRIPTION OF PREFERRED EMBODIMENTS OF THE INVENTIONS

Figure 1:
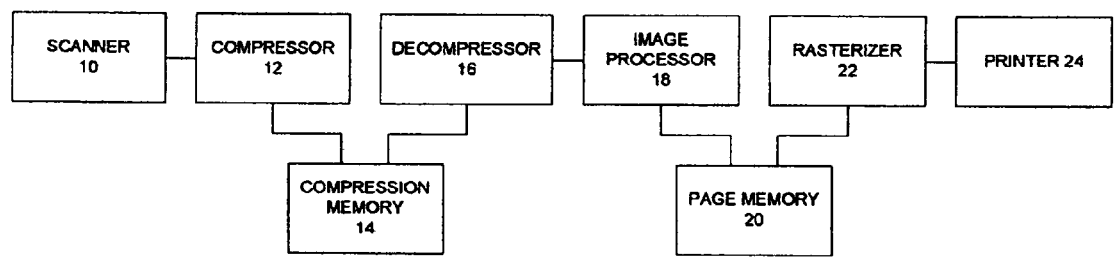
FIG. 1 is a block diagram of an image reproduction system consistent with the present invention.

FIG. 1 is a block diagram of an image reproduction system consistent with the present invention. The image reproduction system can be implemented, for example, as a copier or a multi-function peripheral (MFP) having a scanning and printing function. It is also possible for the image reproduction system to include separate components capable of working in combination, such as a scanner, computer, and printer. As shown in FIG. 1, the image reproduction system includes a scanner 10, a compressor 12, a compression memory 14, a decompressor 16, an image processor 18, a page memory 20, a rasterizer 22, and a printer 24. Each of these elements may be in one device or distributed among two or more devices.

The scanner 10 is configured to scan an original image on a document placed on a document table. The scanner 10 passes a light across the entire surface of the document and converts the reflected light into image data. To generate the image data, the scanner 10 can include a charge-coupled device (CCD), which receives the reflected light, and generates the image data in accordance with the received light. The output of the CCD is typically represented as red, green and blue (RGB) data. It is also possible to have separate color and black/white (B/W) CCDs, with the color CCDs used to detect color data (i.e., RGB data) in the original image and the B/W CCD to detect black data (i.e., K data) in the original image.

The compressor 12 compresses the image data output from the scanner 10. The compressor 12 can compress the image data using any available compression algorithm, such as JPEG format or MMR. The compression algorithm can be implemented, for example, with software or code stored in a memory such as a ROM and executed by a processor such as a CPU. The compressed image data is stored in a compression memory 14, which can be implemented, for example, as RAM or NVRAM.

The decompressor 16 decompresses the compressed image data stored in the compression memory and provides the decompressed image data to the image processor 18. The decompressor 16 can be implemented in the same way as the compressor 12. In addition, the compressor 12 and the decompressor 16 can be implemented as one element or separate elements. The image processor 18 is configured to perform any of a number of image processing functions, such as rotation of the image, filtering, color conversion, halftone processing, gamma correction or other image processing function. Like the compression algorithm, the image processing functions performed by the image processor 18 can be implemented, for example, with software or code stored in a memory such as a ROM and executed by a processor such as a CPU. The processor for performing the compression, decompression and the image processing of the image data can be one processor or a plurality of processors.

The processed image data output from the image processor 18 is received and stored in the page memory 20, which can be implemented for example, as RAM or NVRAM. The rasterizer 22 receives the image data from the page memory 20 and converts it into a print-ready format, and provides it to the printer 24 for printing. The printer 24 may be, for example, an inkjet or laser printer.

Figure 2:
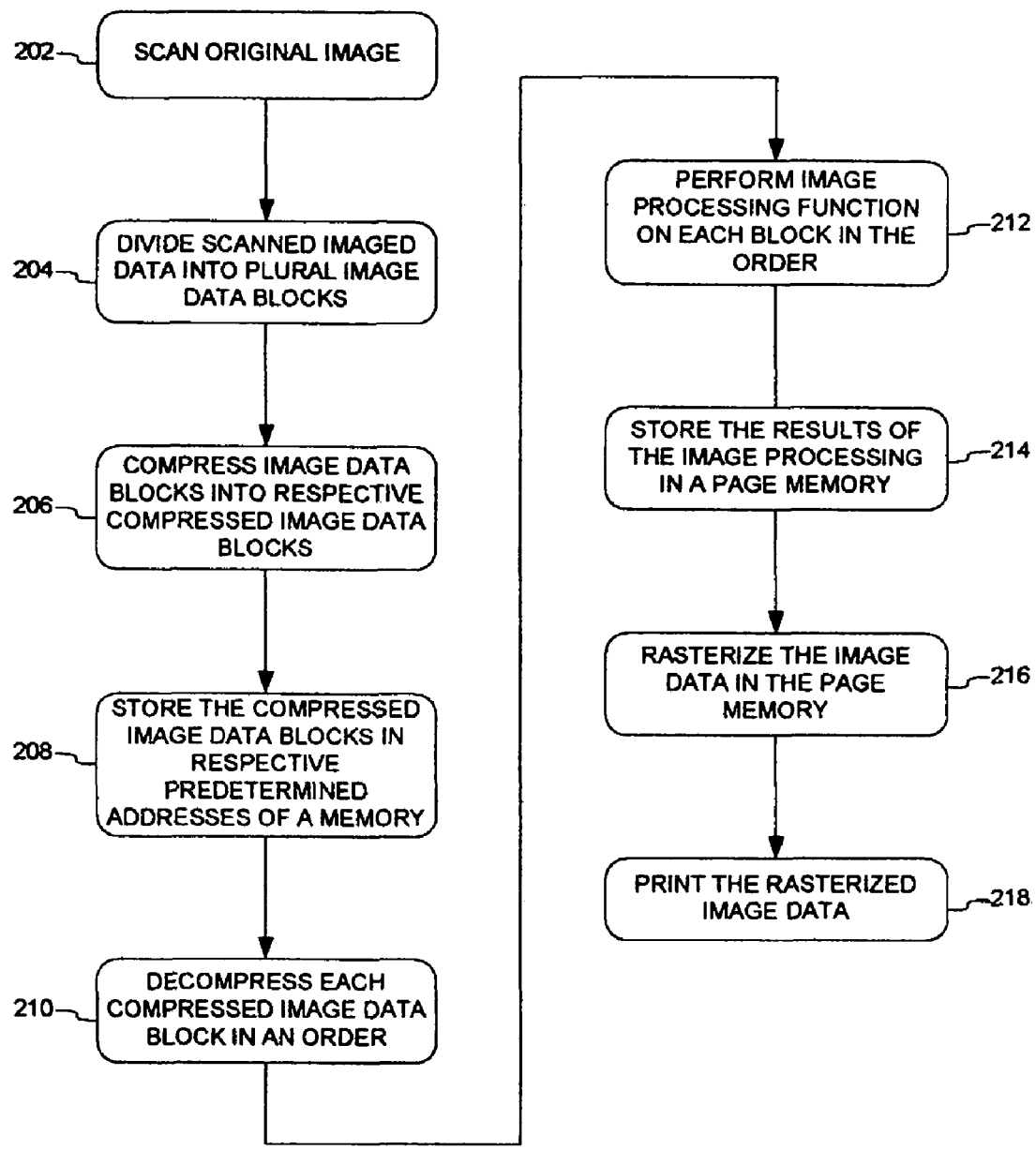
FIG. 2 is a flow diagram of an image reproduction process consistent with the present invention.

FIG. 2 is a flow diagram of an image reproduction process consistent with the present invention. As shown in FIG. 2, the scanner 10 scans an original image (step 202). As noted above, the original image can be scanned by the scanner 10 by placing the document having the original image on a document table, such as a glass plate. The scanned original image is converted by the scanner 10 into image data, such as RGB data.

The RGB data output from the scanner 10 is divided into a plurality of image data blocks (step 204). To improve the efficiency of the compression of the image data, it is preferable to set each image data block to be at least 64×64 pixels or more, such as 128×128 pixels, 256×256 pixels or 512×512 pixels. Smaller or larger block sizes are also possible, and may be appropriate for a given application. It is also possible for the image data blocks to be rectangular in shape with a different number of pixels in the main scanning direction than the number for pixels in the sub-scanning direction. The function of dividing the data output from the scanner into image data blocks may be performed, for example, by the image processor 18 or by the compressor 12.

Figure 3A:
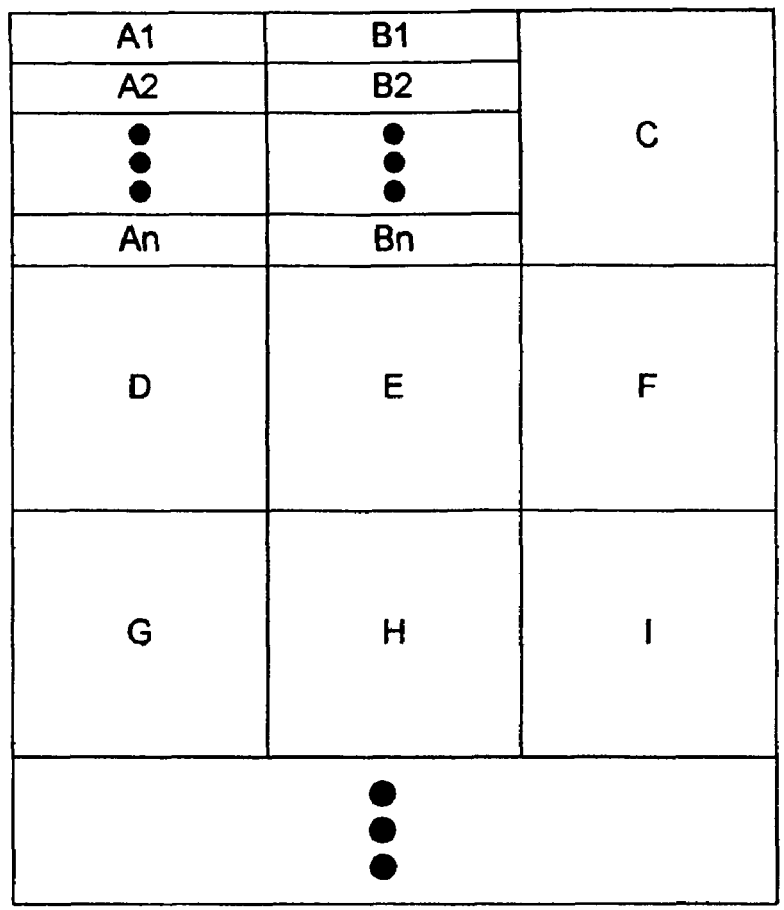
FIGS. 3A and 3B are representations of an original image and a compression memory, respectively, consistent with the present invention.

FIG. 3A is a representation of an original image divided into a plurality of image data blocks. The plurality of image data blocks shown include image data blocks A-I. More specifically, as shown in image data blocks A and B, each image data block includes a number of pixels, n, which depends on the size of the image data block. For example, if each image data block is 64×64 pixels, then n would be 4096.

The compressor 12 receives all of the image data blocks and compresses them into respective compressed image data blocks (step 206). As described above, the compressor 12 can use any available compression algorithm, such as JPEG or MMR, to compress each image data block. The compression of each image data block is preferably done independent of compressing each of the other image data blocks. In other words, the data in each compressed image data block does not depend on the data of any other compressed image data block. To compress the image data, the compressor 12 can be configured to perform the division of the image data into a plurality of image data blocks before performing the compression of each image data block. Alternatively, the division of the image data into a plurality of image data blocks can be performed independently of the compressor 12, such as by a processor executing code stored in a memory configured to divide the image data.

Figure 3B:
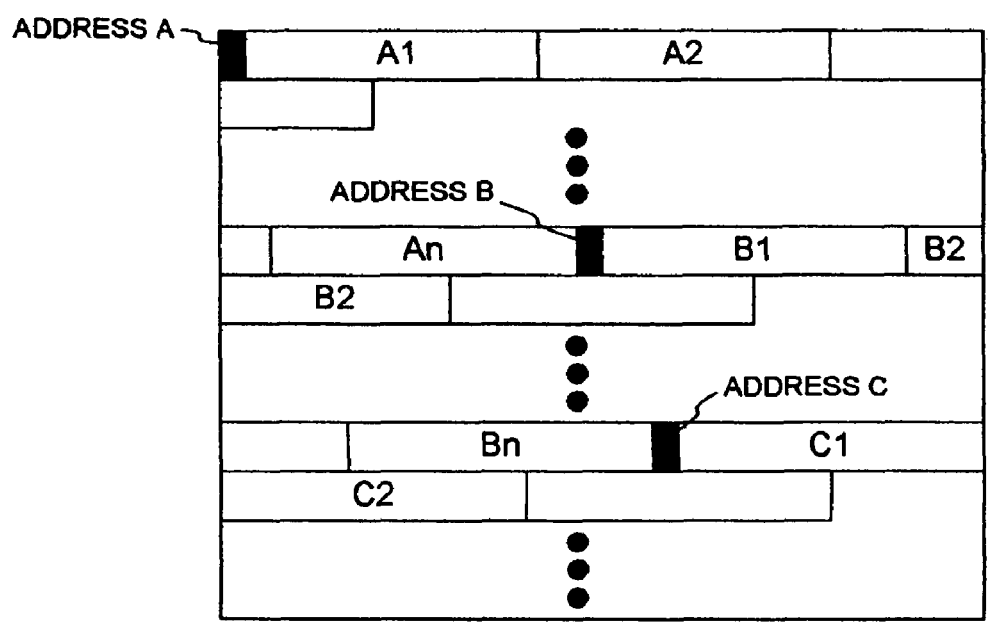

Each the compressed image data block is stored at a respective predetermined address of the compression memory 14 (step 208). FIG. 3B is a representation of a portion of the compressed image data blocks as stored in the compression memory 14. As shown in FIG. 3B, the compressed image block data A is stored at the predetermined Address A. Similarly, compressed image data blocks B and C are stored at predetermined Addresses B and C, respectively.

Under one possible approach, the offset between each predetermined address, such as between Addresses A and B, is preferably predetermined and set to hold the largest possible amount of data to be stored that could result from compression of an image data block without extending into the next predetermined address. With such an offset, in most circumstances, it is likely that the compressed image data block will not use all of the memory space between each pair of predetermined addresses. Accordingly, although compressed image data pixels An and Bn are shown as abutting Address B and Address C, respectively, it is likely that there would be empty memory address between the last compressed image data pixel of a particular block and the subsequent predetermined address corresponding to the beginning of the next compressed image data block. A marker may be used to indicate the last data point of a compressed image data block.

When the image reproduction device is ready to print the original image, the decompressor 16 decompresses the compressed image data blocks in a particular order (step 210). The order in which the compressed image data blocks are decompressed can be fixed, set by a user or configurable according to the size of the document having the original image. The order of decompression can also take into account image processing functions that may be performed on the image data. For example, if the image data is being rotated, the block decompression order may be changed to account for differences in the order in which the image data is reproduced by the printer 24.

Figure 4A:
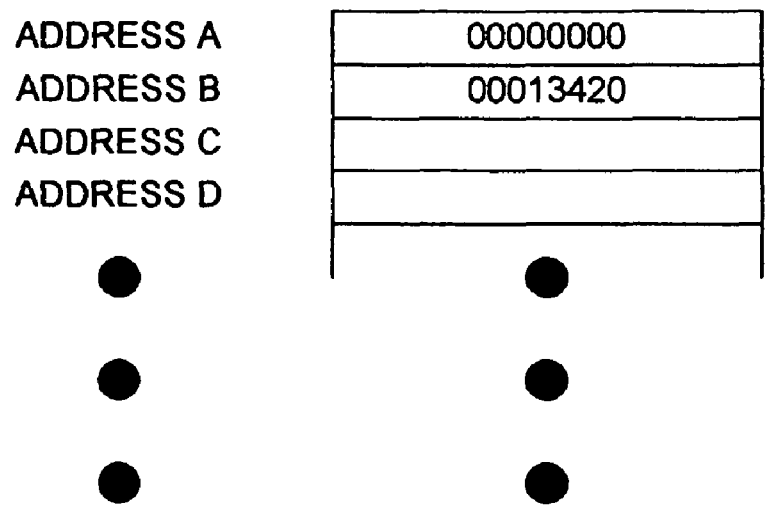
FIGS. 4A and 4B are representations of a memory address table and a page memory, respectively, consistent with the present invention.

To read out the compressed image data blocks in a particular order, the decompressor 16 can refer to a memory address table. The memory address table identifies the beginning address of each compressed image data block. FIG. 4A is a representation of a memory address table consistent with the present invention. As shown in FIG. 4A, Address A corresponding to the beginning of compressed image data block A is at address 00000000, and Address B corresponding to the beginning of compressed image data block B is at address 00013420. The addresses stored in the memory address table, identifying the beginning address of each compressed image data block, are stored in the memory address table when the blocks are stored in the compression memory 14. This table is referred to when it becomes necessary to access the desired compressed image data block for decompressing and image processing. However, if each compressed image data block is stored with a predetermined beginning address as outlined above, the address of each compressed image data block is known ahead of time. As a result, it is possible to determine the location of each compressed image data block without the need to create a memory address table after storing the blocks nor the need to refer to a memory address table to obtain the compressed data block for decompressing. In other words, the memory address table can be avoided in this instance.

When the image data blocks are compressed, the size of the compressed image data block depends on the complexity of the image data in the block. In general, the more complex the image data in the block, the larger the size of the compressed image data block. Further, the amount of time to decompress a compressed image data block will vary according to the size of the compressed image data block, with larger blocks taking longer to decompress. If the printing of a first decompressed image data block is completed before the next one is decompressed, there may be a delay during the printing of the original image. To avoid such a delay, the decompressor 16 may read out and decompress two compressed image data blocks at the same time, either selectively or for all processing. The two blocks to be simultaneously decompressed can be determined taking into how the subsequent image processing, such as rotation, is to be carried out, to ensure that the necessary blocks have been decompressed in time for the printing operation.

Each decompressed image data block is received the image processor 18, which performs one or more image processing functions on the decompressed block in the order received from the decompressor 16 (step 212). As described above, the image processor 18 is configured to perform any of a number of image processing functions, such as rotation of the image, filtering, color conversion, halftone processing, gamma correction or other image processing function. As one example, one image block is decompressed and rotated, then the next image block is decompressed (which decompressing may occur while the first image block is being rotated) and rotated, and so on.

Figure 4B:
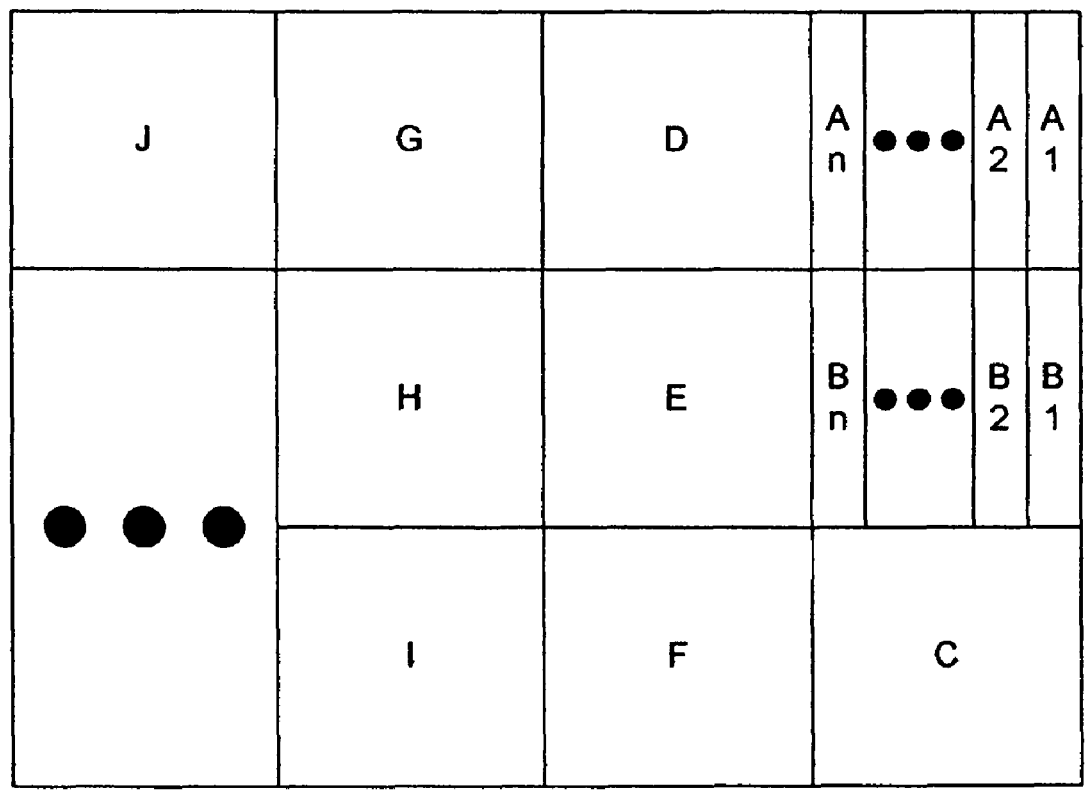

After performing the image processing functions, the resulting image data is stored in the page memory 20 (step 214). The size of the page memory 20 may correspond to the size of the original image data. FIG. 4B is a representation of the page memory 20 after the image data has been rotated. As shown in FIG. 4B, the page memory 20 is shown as being sufficiently sized to hold all of the decompressed and rotated image data. For example, if the image data were not divided into blocks before compressing the image data on a block level, the page memory 20 should be large enough to store all of the image data of the original image because the decompressor 16 decompresses all of the compressed image data at the same time.

Alternatively, employing the exemplary method outlined above, the size of the page memory 20 may be reduced. By dividing the image data into blocks, the image processor 18 can perform its image processing functions including rotation on each decompressed image data block, either one block or two blocks at a time, and store them in the page memory 20. Once a sufficient number of decompressed and processed blocks are stored in the page memory 20, the printing operation can begin. The page memory 20 can be reduced to hold only as many decompressed image data blocks as are sufficient to begin and then continue printing. For example, with reference to FIG. 4B, it may be possible to begin printing as soon as a first column of image data block has been stored in the page memory 20, such as blocks A, D, G and J (or blocks A, B and C depending upon the side that printing begins). Under this example, the page memory 20 can be accordingly sized to fit one column of image data blocks. If the decompressor 16 decompresses two blocks at a time, then the page memory 20 may be sized to fit two columns of image data blocks. In either case, the size of the page memory 20 is less than a size otherwise required to hold all of the original image data. In mathematical terms, the size of the page memory 20 can be set as $l \geq \max(m, n)$, where m is the pixel quantity in the main scanning direction of a block in the image, n is the pixel quantity in the sub-scanning direction of a block in the image, and l is the size of the page memory 20 in the main scanning direction of the image. To buffer more than one block, the size of the page memory 20 can be set as $l \geq k \cdot \max(m, n)$, where k is the number of blocks. For example, to buffer two blocks, i.e., double buffering, k would be two.

After image data is stored in the page memory 20 and the printer 24 is ready for printing, image data is read from the page memory 20 by the rasterizer 22, which rasterizes or converts the image data into a printable format (step 216). The rasterized image data is provided to the printer 24, which prints or reproduces the original image (step 218).

The foregoing description of a preferred embodiment of the invention has been presented for purposes of illustration and description. Of course, the various steps of detecting text, background, graphical and picture regions can be done in any order. It is not intended to be exhaustive or to limit the invention to the precise form disclosed, and modifications and variations are possible in light in the above teachings or may be acquired from practice of the invention. The embodiments were chosen and described in order to explain the principles of the invention and as practical application to enable one skilled in the art to utilize the invention in various other embodiments and with various modifications are suited to the particular use contemplated. It is intended that the scope of the invention be defined by the claims appended hereto and their equivalents.

What is claimed is:

1. An image processing method, comprising:
   scanning an original document to generate image data corresponding to the scanned original document;
   dividing the image data of the scanned original document into a plurality of image data blocks;
   compressing the plurality of image data blocks into respective compressed image data blocks, such that data of each compressed image data block is independent of data of each other compressed image data block;
   storing each compressed image data block in a first memory with a respective predetermined beginning address;
   accessing a first compressed image data block, having a first predetermined beginning address, from the first memory and decompressing the first compressed image data block into a first decompressed image data block; and
   performing at least one image processing function on the decompressed first image data block; and
   storing the decompressed first image data block in a second memory after performing the at least one image processing function,
   wherein one of the at least one image processing functions is to rotate the image data,
   wherein a second compressed image data block is stored in the first memory and has a second predetermined beginning address that is offset by a predetermined amount from the first predetermined address, the method further comprising:
   accessing the second compressed image data block from the first memory and decompressing the second compressed image data block into a second decompressed image data block;
   performing the at least one image processing functions on the second decompressed image data block; and
   storing the decompressed second image data block in the second memory after performing the at least one image processing function.

2. A method according to claim 1, wherein the second decompressed image data block is stored in the second memory in a position adjacent to the first image data block.

3. A method according to claim 1, wherein the first and second decompressed image data blocks are rotated, and
   wherein the first decompressed image data block is rotated before the second decompressed image data block is rotated.

4. A method according to claim 1, wherein the first memory is configured to store the compressed image data blocks, and the second memory is a page memory.

5. A method according to claim 4, wherein a size of the page memory is configured to correspond in size to a predetermined number of decompressed image data blocks that is less than the total number of decompressed image data blocks for the document.

6. A method according to claim 4, wherein the size of the page memory corresponds in size to one column of image data of decompressed image data blocks of the image data.

7. A method according to claim 4, wherein the size of the page memory corresponds in size to a multiple of one column of image data of decompressed image data blocks of the image data, the multiple being at least two.

8. A method according to claim 1, wherein the first decompressed image data block is stored at a predetermined beginning address of the second memory.

9. A method according to claim 1, wherein each remaining compressed image data block is stored in the first memory at a predetermined beginning address having a respective predetermined offset from the first predetermined beginning address.

10. A method according to claim 1, wherein, after storing the compressed first image data block, the first memory includes unused memory addresses between an end of the first compressed image data block and a second predetermined address corresponding to a beginning address of a second compressed image data block.

11. A method according to claim 1, further comprising:
rasterizing the image data in the second memory before all of the compressed image data blocks have been decompressed; and
printing the rasterized image data.

12. A method according to claim 1, wherein the step of decompressing includes decompressing at least two compressed image data blocks at a time.

13. A method according to claim 1, wherein the size of each image data block is one of 256×256 pixels and 512×512 pixels.

14. An image processing method, comprising:
scanning an original document to generate image data corresponding to the scanned original document;
dividing the image data of the scanned original document into a plurality of image data blocks;
compressing the plurality of image data blocks into respective compressed image data blocks, such that data of each compressed image data block is independent of data of each other compressed image data block;
storing each compressed image data block in a first memory with a respective predetermined beginning address;
accessing a first compressed image data block, having a first predetermined beginning address, from the first memory and decompressing the first compressed image data block into a first decompressed image data block;
performing at least one image processing function on the decompressed first image data block;
storing the decompressed first image data block in a second memory after performing the at least one image processing function;
accessing and decompressing each of the remaining compressed image data blocks one at a time in a predetermined order;
performing the at least one image processing function on each of the remaining image data blocks after the image data block is decompressed, respectively; and
storing each of the remaining image data blocks in the second memory after performing the at least one image processing function to the image data blocks.

15. A method according to claim 14, wherein each remaining compressed image data block is stored in the first memory at a predetermined beginning address having a respective predetermined offset from the first predetermined beginning address, and
wherein the step of accessing the compressed image data blocks is performed without reference to an address table.

16. A method according to claim 14, further comprising:
rasterizing all of the image data of the document stored in the second memory; and
printing the rasterized data.

17. An image forming apparatus configured to reproduce original documents, comprising:
a scanner that scans an original document and generates image data corresponding to the scanned original document;
a compressor that divides the image data of the scanned original document into a plurality of image data blocks and compresses the plurality of image data blocks, which correspond to respective portions of the image data generated by the scanner, into respective compressed image data blocks, such that data of each compressed image data block is independent of data of each other compressed image data block;
a first memory that stores each compressed image data block at a respective predetermined beginning address;
a decompressor that accesses a first compressed image data block, having a first determined beginning address, from the first memory and decompresses the first compressed image data block into a first decompressed image data block;
an image processor that performs at least one image processing function on the decompressed first image data block; and
a second memory that stores the decompressed first image data block after the image processor performs the at least one image processing function,
wherein one of the at least one image processing functions is to rotate the image data,
wherein the first memory stores a second compressed image data block at a second predetermined beginning address that is offset by a predetermined amount from the first predetermined address, and
wherein the decompressor accesses the second compressed image data block from the first memory and decompresses the second compressed image data block into a second decompressed image data block,
wherein the image processor performs the at least one image processing functions on the second decompressed image data block, and
wherein the second memory stores the decompressed second image data block after the image processor performs the at least one image processing function.

18. An image forming apparatus according to claim 17, wherein the second memory stores the second decompressed image data block in a position adjacent to the first image data block.

19. An image forming apparatus according to claim 17, wherein the image processor rotates first and second decompressed image data blocks, and
wherein the image processor rotates first decompressed image data block before rotating the second decompressed image data block.

20. An image forming apparatus according to claim 17, wherein the first memory is configured to store the compressed image data blocks, and the second memory is a page memory.

21. An image forming apparatus according to claim 20, wherein a size of the page memory is configured to correspond in size to a predetermined number of decompressed image data blocks that is less than the total number of decompressed image data blocks for the document.

22. An image forming apparatus according to claim 20, wherein the size of the page memory corresponds in size to one column of image data of decompressed image data blocks of the image data.

23. An image forming apparatus according to claim 20, wherein the size of the page memory corresponds in size to a multiple of one column of image data of decompressed image data blocks of the image data, the multiple being at least two.

24. An image forming apparatus according to claim 17, wherein the first decompressed image data block is stored at a predetermined beginning address of the second memory.

25. An image forming apparatus according to claim 17, wherein the first memory stores each remaining compressed image data block at a predetermined beginning address having a respective predetermined offset from the first predetermined beginning address.

26. An image forming apparatus according to claim 24, further comprising:
   a rasterizer that rasterizes the image data in the second memory before all of the compressed image data blocks have been decompressed; and
   a printer that prints the rasterized image data.

27. An image forming apparatus according to claim 24, wherein the first memory includes unused memory addresses between an end of the first compressed image data block and a second predetermined address corresponding to a beginning address of a second compressed image data block.

28. An image forming apparatus according to claim 24, wherein the decompressor decompresses at least two compressed image data blocks at a time.

29. An image forming apparatus according to claim 24, wherein the size of each image data block is one of 256×256 pixels and 512×512 pixels.

30. An image forming apparatus configured to reproduce original documents, comprising:
   a scanner that scans an original document and generates image data corresponding to the scanned original document;
   a compressor that divides the image data of the scanned original document into a plurality of image data blocks and compresses the plurality of image data blocks, which correspond to respective portions of the image data generated by the scanner, into respective compressed image data blocks, such that data of each compressed image data block is independent of data of each other compressed image data block;
   a first memory that stores each compressed image data block at a respective predetermined beginning address;
   a decompressor that accesses a first compressed image data block, having a first predetermined beginning address, from the first memory and decompresses the first compressed image data block into a first decompressed image data block;
   an image processor that performs at least one image processing function on the decompressed first image data block;
   a second memory that stores the decompressed first image data block after the image processor performs the at least one image processing function,
   wherein the decompressor accesses and decompresses each of the remaining compressed image data blocks one at a time in a predetermined order,
   wherein the image processor performs the at least one image processing function on each of the remaining image data blocks after the image data block is decompressed by the decompressor, respectively, and
   wherein the second memory stores each of the remaining image data blocks after the image processor performs the at least one image processing function to the image data blocks.

31. An image forming apparatus according to claim 30, wherein the first memory stores each remaining compressed image data block at a predetermined beginning address having a respective predetermined offset from the first predetermined beginning address, and
   wherein the decompressor accesses the compressed image data blocks without reference to an address table.

32. An image forming apparatus according to claim 30, further comprising:
   a rasterizer that rasterizes all of the image data of the document stored in the second memory; and
   a printer that prints the rasterized data.

* * * * *